T. BELKNAP.
ANIMAL-TRAP.

No. 186,448. Patented Jan. 23, 1877.

WITNESSES
Nat. E. Oliphant.
F. C. Burrhus

INVENTOR
Thaddeus Belknap.
per Charles H. Fowler
Attorney.

UNITED STATES PATENT OFFICE.

THADDEUS BELKNAP, OF AUSTINBURG, OHIO.

IMPROVEMENT IN ANIMAL-TRAPS.

Specification forming part of Letters Patent No. 186,448, dated January 23, 1877; application filed November 11, 1876.

*To all whom it may concern:*

Be it known that I, THADDEUS BELKNAP, of Austinburg, in the county of Ashtabula and State of Ohio, have invented a new and valuable Improvement in Animal-Traps; and I do hereby declare that the following is a full, clear, and exact description of the construction and operation of the same, reference being had to the annexed drawings, making a part of this specification, and to the letters and figures of reference marked thereon.

Figure 1:
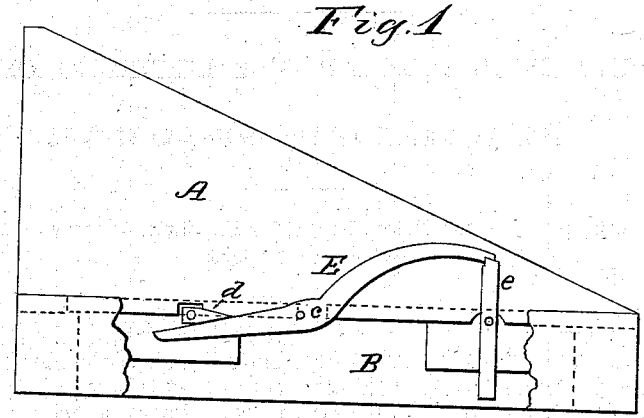
Figure 2:
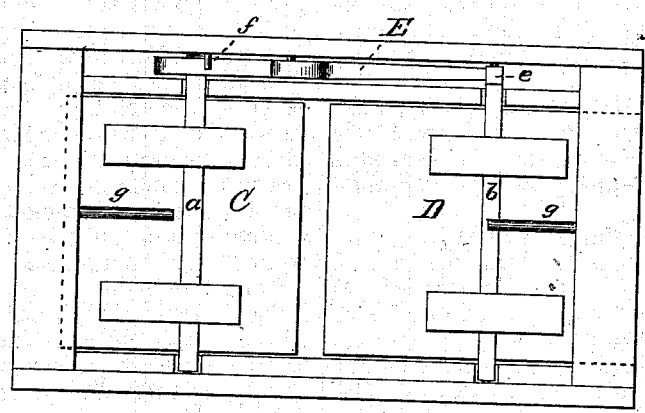

Figure 1 of the drawing is a representation of a side elevation of my improved animal-trap, partly broken away to show the operating-levers. Fig. 2 is a plan view of the under side of the trap.

This invention has relation to animal-traps; and consists in providing said traps with two tilting platforms connected with suitable mechanism, and operating as will be hereinafter described.

In the accompanying drawings, A represents a box or frame of the form shown, and is secured to an open base, B. Within the frame A is suitably hung, upon pivoted bars $a\ b$, two tilting platforms, C D, and to the base B, between it and the side of the box or frame, is pivoted at $e$ a curved lever, E. The cross-bar $a$, by which the platform C is pivoted to the box or frame, has a short horizontal arm, $d$, resting upon that end of the lever below the pivot $c$, and the cross-bar $b$ of the tilting platform D has a vertical arm, $e$, upon the end of which rests the curved end of the lever E. A stop, $f$, is secured within and upon the side of the base, against which the end of the lever presses; also stops $g$ are secured to the ends of the base, to prevent the platforms from tilting too far.

In describing the operation of my invention, it will be first understood that the trap is baited back of the platform C, after which the trap is placed over a suitable receptacle containing water, a board being placed so as to extend from the platform D to the floor, upon which a little meal or other suitable bait is placed. When pressure or weight is applied to the platform D—as, for instance, when an animal steps upon it—it becomes firm and stationary, owing to the pressure of the vertical arm $e$ upon the under side of the lever E, which also brings the end of the lever below the pivot $c$ against the under side of the short arm $d$; but, when stepping upon the platform C, the short horizontal arm $d$ of the said platform is pressed down against the end of the lever by the tilting of the same, which also raises and releases the curved end of the lever E from the vertical arm $e$, when both platforms are tilted, causing the animal to be precipitated into the receptacle containing water.

Having now fully described my invention, what I claim as new, and desire to secure by Letters Patent, is—

The combination, in an animal-trap, of two tilting platforms constructed and arranged relatively to each other, substantially as described, so that when pressure or weight is applied to the outer platform it will remain stationary, and both platforms become tilting when the pressure or weight is applied to the inner platform, as specified.

In testimony that I claim the above I have hereunto subscribed my name in the presence of two witnesses.

THADDEUS BELKNAP.

Witnesses:
E. B. LEONARD,
S. L. ROOT.